US007376613B1

(12) United States Patent
Cofino et al.

(10) Patent No.: US 7,376,613 B1
(45) Date of Patent: May 20, 2008

(54) BUSINESS METHOD FOR COMPARISON SHOPPING WITH DYNAMIC PRICING OVER A NETWORK

(75) Inventors: Thomas Anthony Cofino, Rye, NY (US); Juhnyoung Lee, Yorktown Heights, NY (US); Mark Edward Podlaseck, Washington, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,725

(22) Filed: Apr. 21, 2000

(51) Int. Cl.
*G06Q 30/00* (2006.01)
(52) U.S. Cl. .......................... 705/37; 705/26; 705/27; 705/38; 705/39; 705/80
(58) Field of Classification Search ................ 705/37, 705/26, 27, 17, 39, 40, 38, 80
See application file for complete search history.

(56) References Cited

U.S. PATENT DOCUMENTS

| 5,890,138 | A | | 3/1999 | Godin et al. |
| 6,016,504 | A | * | 1/2000 | Arnold et al. .............. 709/200 |
| 6,029,141 | A | * | 2/2000 | Bezos et al. .................. 705/27 |
| 6,598,026 | B1 | * | 7/2003 | Ojha et al. .................... 705/26 |

FOREIGN PATENT DOCUMENTS

WO    WO 98/10361    *  3/1998

OTHER PUBLICATIONS

Tedeschi, Bob, "New Tools Make It Easier to Find the Lowest Price", The New York Times, Nov. 22, 1999.*
"ClickTheButton.com Reduces Barrier to Entry into the Shopping Companion Market", Business Wire, Jan. 25, 2000.*
"ClickTheButton.com, Inc. Announces Free Internet Service Enabling Single Click Price Comparisions . . . ", Business Wire, Mar. 26, 1999.*
"ClickTheButton.com Announces That Online Shoppers Can Now Obtain Independent Price Comparisions . . . ", Business Wire, Jun. 30, 1999.*
Whit Andrews, "The New Laws of Dynamic Pricing," Internet World, Dec. 15, 1999, pp. 27-33.
Whit Andrews, "Courting Retailers Metasearchers increasingly cozy up to e-comerce sites," Internet World, Jan. 15, 2000, pp. 33-34.
Carol Pickering, "Amazon.com's Bubble Bath," Business 2.0, Dec. 1999, 1 page.
Bob Tedeschi, "New Tools Make It Easier to Find the Lowest Price," http://www.nytimes.com/library/tech/99/11/cyber/commerce/22commerce.html, Nov. 22, 1999, 5 pages.

* cited by examiner

*Primary Examiner*—Nga Nguyen
(74) *Attorney, Agent, or Firm*—Scully, Scott, Murphy & Presser, P.C.; Rafael Pineiro, Esq.

(57) ABSTRACT

A user is provided with access to a preferred online store through one or more networks. The online store has one or more products each with a product description and a price. The product description and price are provided to the user. A computer receives one or more selection requests for one or more of the products (selected products) from the user. The user is provided with one or more bid conditions for the selected product which the user selects from. The user is then provided one or more second bids. Each of the second bids originates from one or more other stores that participated in an auction and each of the second bids conforms to the bid conditions selected by the user.

35 Claims, 15 Drawing Sheets

700

| Attribute Name | Attribute Value |
|---|---|
| Name | WorkPad A |
| Manufacturer | IBM |
| Model number | 64W31141 |
| UPC | 516-8473 |
| Memory | 4 MB |
| Display | LCD |
| Weight | 0.5 lbs |
| Battery | Alkaline 2/AAA |
| Color | Black |
| ... | ... |

703 — Attribute Name
704 — Attribute Value
701

FIG. 7A

| Store Number | Store Name | Availability Last Checked | Bid Last Participated | Bid Last Accepted | Attribute | Homepage |
|---|---|---|---|---|---|---|
| 1 | foo.com | 25-Jan-00 | 25-Jan-00 | 25-Jan-00 | N/A | www.foo.com |
| 2 | bar.com | 25-Jan-00 | 25-Jan-00 | 24-Jan-00 | Discount for shopper group A | www.bar.com |
| 3 | acme.com | 24-Jan-00 | 24-Jan-00 | 24-Jan-00 | N/A | www.acme.com |
| 4 | peddler.com | 12-Nov-99 | 10-Nov-99 | 25-Sep-99 | Group C shoppers only | www.ped.com |

| Store | Product | Bid Price | Web Page For Purchase | Shipping Options | Total Cost | Tax State |
|---|---|---|---|---|---|---|
| foo.com | WorkPad A | $345.00 | www.foo.com/c3/buy.html | USPS parcel post $3.90<br>UPS 2nd day air $7.90<br>UPR next day air $10.90 | $348.90<br>$352.90<br>$355.90 | NY |

| Store | Comparable Products | Price | Web Page For Information | Web Page For Purchase |
|---|---|---|---|---|
| foo.com | WorkPad B<br>WorkPad C<br>Palm A<br>Palm B | $299.00<br>$799.00<br>$309.99<br>$238.99 | www.foo.com/wp.html<br>www.foo.com/z50.html<br>www.foo.com/palmv.html<br>www.foo.com/palmx.html | www.foo.com/wp/buy.html<br>www.foo.com/z50/buy.html<br>www.foo.com/pv/buy.html<br>www.foo.com/px/buy.html |

FIG. 8C

| Store | Additional Services Available | Web Page For Information |
|---|---|---|
| foo.com | Express checkout<br>Add to wish list<br>Build-to-order service<br>Reward program | www.foo.com/1c.html<br>www.foo.com/wish.html<br>www.foo.com/bto.html<br>www.foo.com/rew.html |

| Store | Bid Price | Shipping | Total Cost | Tax | Purchase Link | Additional Services |
|---|---|---|---|---|---|---|
| foo.com | $345.00 | USPS parcel post $3.90<br>UPS 2nd day air $7.90<br>UPR next day air $10.90 | $348.90<br>$352.90<br>$355.90 | NY | www.foo.com/c3/buy.html | One-click checkout<br>Add to wish list<br>Built-to-order service<br>Reward program |
| bar.com | $339.99 | Free shipping & handling | $339.99 | CT | www.bar.com/c3/buy.html | N/A |
| acme.com | $375.00 | USPS parcel post $3.95<br>FedEx two day $7.95<br>FedEx overnight $10.95 | $78.95<br>$382.95<br>$385.95 | NJ | www.acme.com/c3/buy.html | Express checkout<br>Reward program<br>Discount for educational shoppers |

FIG. 9A

| Product | Store | Price | Product Information Link | Purchase Link |
|---|---|---|---|---|
| WorkPad B | foo.com<br>acme.com | $299.00<br>$315.00 | www.foo.com/wp.html<br>www.acme.com/wp.html | www.foo.com/wp/buy.html<br>www.foo.acme/wp/buy.html |
| WorkPad C | foo.com<br>acme.com | $799.00<br>$795.00 | www.foo.com/z50.html<br>www.acme.com/z50.html | www.foo.com/wp/buy.html<br>www.acme.com/z50/buy.html |
| Palm A | foo.com<br>bar.com<br>acme.com | $309.99<br>$299.00<br>$319.00 | www.foo.com/pv.html<br>www.bar.com/pv.html<br>www.acme.com/pv.html | www.foo.com/wp/buy.html<br>www.bar.com/pv/buy.html<br>www.acme.com/pv/buy.html |
| Palm B | foo.com<br>bar.com<br>acme.com | $238.99<br>$219.00<br>$249.99 | www.foo.com/px.html<br>www.bar.com/piiix.html<br>www.acme.com/piiix.html | www.foo.com/wp/buy.html<br>www.bar.com/piiix/buy.html<br>www.acme.com/piiix/buy.html |
| Casio Pela A | foo.com<br>bar.com | $199.99<br>$190.00 | www.foo.com/ca.html<br>www.bar.com/casio.html | www.foo.com/wp/buy.html<br>www.bar.com/casio/buy.html |
| Palmtop A | acmecom | $534.99 | www.acme.com/pt360.html | www.acme.com/pt360/buy.html |

FIG. 9B

BUSINESS METHOD FOR COMPARISON SHOPPING WITH DYNAMIC PRICING OVER A NETWORK

FIELD OF THE INVENTION

This invention relates to shopping over a computer network. More specifically, the invention relates to shopping over the Internet where pricing for similar items can be obtained from different online network sites, e.g. e-commerce stores.

BACKGROUND OF THE INVENTION

Commerce over networks, particularly e-commerce over the Internet, has increased significantly over the past few years. Part of e-commerce enables users/customers to access information of products and to purchase them from various commercial Web sites (i.e. online stores). There are numerous online stores currently operating in the Internet including Amazon.com, eToys.com, Buy.com, Wal-Mart.com, LLBean.com, and Macys.com. These online stores provide various customer services to make commerce activities possible over Web sites. Some of the examples of the basic services are catalogs of merchandise which are both browsable and searchable by various product attributes (e.g., keyword, name, manufacturer, and model number), shopping carts, and checkout process. Some online stores also provide advanced customer services such as wish lists, gift registries, calendars, custom-configuration of products, buyer's groups, chatting, e-mail notification, and in-context sales.

One experience of online shopping is that a shopper can easily move from one online store to another by pointing his/her browser to the store's hyperlink with any well-known input device (e.g. a mouse). This experience of online shopping appeals to price-sensitive consumers and deal-prone buyers for corporations and significantly contributes to its increasing popularity. Shoppers usually search the Internet/Web to find the best deals. Certainly, searching over the Internet for good deals is less laborious than visiting many brick-and-mortar stores in the physical world for products and their price information. However, the job can become easily tedious and time-consuming. Moreover, a shopper can never be sure if he/she finds the best deal without complete information about products and merchants. To help such shoppers in this situation, a new type of e-commerce Web site called an aggregator has appeared. An aggregator Web site itself is not an online store, but it provides a marketplace where a shopper can view aggregated information of merchandise from various e-commerce stores. Note that different aggregators use different business models. For example, while Yahoo! as an e-commerce aggregator provides shoppers with categories of merchandise and a gateway to the participating merchants' Web stores through their Yahoo! web site categories, other aggregators such as Priceline.com and eBay use different forms of auction to create a marketplace.

Another form of aggregators of interest is Web sites which provide comparison shopping services. These Web sites collect and compile information about products and online stores. When a user comes to the Web site and performs a price comparison for a product, the site provides a hit list of online stores with the best deals for the product of interest. Examples of these comparison shopping sites are MySimon.com and DealTime.com. We call these sites the "first generation" of comparison shopping. While these comparison shopping sites save shoppers the work of searching the Internet for good deals, they have one key weakness in that they require users to start shopping in their sites before they get to actual online stores providing the best deal. This weakness may not be critical to some users. However, as the online shopping experience gets deeper and broader, and as online stores provide more and more services and differentiate themselves from others, online shoppers tend to favor some stores over others in various shopping scenarios. The weakness of the first generation comparison shopping services will become serious for such online shoppers. Sometimes, such a shopper visits his/her preferred online store first to obtain information about products of interest, and then goes to a comparison shopping service site to compare the price of the selected products in other online stores and then decides in which store he/she wants to complete the purchase.

Recently, there are new types of comparison shopping services which resolve the weakness of the first generation services. We call them the "second generation" of comparison shopping services. Examples of the second generation services are RUSure, Clickthebutton, DealPilot, and zBubble from Alexa (an Amazon.com subsidiary). These new services do not require users to start shopping in their sites. In the first place, they are not Web sites at all. Rather, each of these services is a computer process running on the user's (shopper's) computer. For a user to have the service, he/she downloads and installs the program in their computer. The user can start shopping in his/her preferred online store and find information about the merchandise of interest in the store. While the user browses and searches products in his/her Web browser, the comparison shopping process automatically starts running and monitors Web pages the user views. (In this sense, the comparison shopping program is a type of software agent.) As soon as the user selects a product, the software agent program makes available a list of other stores with a better price. The user can select an online store from the list, and go to the store to complete the purchase. In summary, the user is able to get information about product(s) of interest in his/her preferred store (Store A), but purchase the product(s) from another store (Store B) providing a better deal with the help of the second generation comparison shopping program. Note that many merchants consider this type of behavior of the second generation services unfair or unethical, because online stores (e.g., Store B in our example) may use/abuse such a service to lead customers out of a competitors online store (Store A) to buy products through them (Store B).

Another prior art area for this invention is price negotiation or dynamic pricing in the Internet in the form of auction. Auction is a trading mechanism which is traditionally used for liquidating surplus at best possible prices. It enables a wide range of potential buyers to bid competitively for products at below-market prices. As the mechanism is adopted and popularized by many online auctioneers and merchants in the Internet for consumer trading, it evolves into many different formats. Internet auctions are broadly divided into two groups by seller type: person-to-person auctions where sellers are individuals and business-to-consumer auctions where sellers are businesses. Examples of online auctioneers of person-to-person services include eBay, Auction Universe, AuctionMac, Planetbike, and Yahoo! Auctions, and examples of business-to-consumer auctioneers include Egghead, Bid4vacations, Sotheby's and The Sharper Image. Also, auctions practiced in the Internet can be categorized by their format: standard (Chinese) auction where the highest bid wins for each item and bidding is open to the public, parcel bidding which lets bidders buy by the piece, Dutch auction where multiple copies of same product are available and all winning bidders pay the amount of lowest winning bid, reverse auction where a buyer picks a maximum price he/she would pay for the selected product and bids from sellers higher than this price will not be accepted, express auction which limits bidding time (often one hour), private auction which limits buyer and seller access to certain products, and bartering which trades one good for another and cashes payment balance value differences.

PROBLEMS WITH THE PRIOR ART

A problem with the first generation comparison shopping services is that they require users to start shopping in their sites. That is, online shoppers cannot necessarily go to their preferred online store.

A problem with the second generation services is that they can be unfairly or unethically abused, because they may be exploited by an online store to lead customers out of a competitor site to buy products through the store. Users' behavior, activities and other credential information on their computer can be monitored and collected by the agent software, and revealed to others without the users' approval with second generation services. Also, second generation services require that a software program be downloaded and installed on users' computer.

A problem with the both first/second generation services is that the product price they provide in their comparisons is one directly extracted from Web pages of online store sites. Because product price is frequently changing in online stores, the comparison shopping service providers need to frequently recheck online stores to uncover price updates in the online stores.

Further, services of both first/second generation services are limited to transactions for simple merchandise such as books, video tapes, CDs, computer hardware and software and electronics, and do not allow any custom-configuration of (complex) products such as insurance and financial products.

In addition, both first/second generation services have their services centered around product price targeting price-sensitive buyers, while more and more shoppers look for other criteria beyond price such as convenience and trust on purchasing.

Both first/second generation services have services limited to provide information on a single product selected by the user. If the services intelligently select products comparable/related to the selected product and automatically provide users with the information about the comparable/related products, they will provide a bigger convenience to users and online stores can have greater chances to increase revenue.

OBJECTS OF THE INVENTION

An object of this invention is an improved system and method for shopping for products over a network.

An object of this invention is an improved system and method for shopping for products over a network that provides dynamic pricing of products while allowing the user to select any Web site as a starting point.

An object of this invention is an improved system and method for shopping for products over a network that provides dynamic pricing of products while allowing the user to select any Web site as a starting point and at the same time being fair to the merchant owning the starting point site.

An object of this invention is an improved system and method for shopping for products over a network that provides dynamic pricing of products while allowing the user to select any Web site as a starting point, at the same time being fair to the merchant owning the starting point site, and not requiring the service provider to extract price information from Web sites.

An object of this invention is an improved system and method for shopping for products over a network that provides dynamic pricing of products while allowing the user to select any Web site as a starting point, at the same time being fair to the merchant owning the starting point site, not requiring the service provider to extract price information from Web sites, and providing the user with information about various factors related to purchase beyond product price.

An object of this invention is an improved system and method for shopping for products over a network that provides dynamic pricing of products while allowing the user to select any Web site as a starting point, at the same time being fair to the merchant owning the starting point site, not requiring the service provider to extract price information from Web sites, providing the user with information about various factors related to purchase beyond product price, and providing the user with information about comparable and related products as well as the selected product.

An object of this invention is an improved system and method for shopping for products over a network that provides dynamic pricing of products while allowing the user to select any Web site as a starting point, at the same time being fair to the merchant owning the starting point site, not requiring the service provider to extract price information from Web sites, providing the user with information about various factors related to purchase beyond product price, providing the user with information about comparable and related products as well as the selected product, and not revealing users' private information to stores without users' approval.

SUMMARY OF THE INVENTION

The present invention is a method of doing business on a network. A user is provided with access to a preferred online store through one or more networks. The online store has one or more products each with a product description (or other unique product identifier) and a price. The product description and price are provided to the user. A computer receives one or more selection requests for one or more of the products (selected products) from the user. The user is provided with one or more bid conditions for the selected product which the user selects from. The user is then provided one or more second bids. Each of the second bids originates from one or more stores that participated in an auction and each of the second bids conforms to the bid conditions selected by the user.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 7 is a sample attribute table and a sample store table of products.

FIG. 8 is a sample bid and associated conditions.

FIG. 9 is a sample bid list.

DETAILED DESCRIPTION OF THE INVENTION

The present invention is primarily disclosed in the description of FIG. 2 below with support of the description of the other figures. A related patent application Ser. No. 09/556,722, entitled SYSTEM, PROGRAM PRODUCT, AND METHOD FOR COMPARISON SHOPPING WITH DYNAMIC PRICING OVER A NETWORK, to Cofino et al. (the same inventorship as this disclosure) and filed the same day as this disclosure, Apr. 21, 2000, will further claim the subject matter of FIGS. 1-11 and is herein incorporated by reference in its entirety.

Figures 1, 1A:
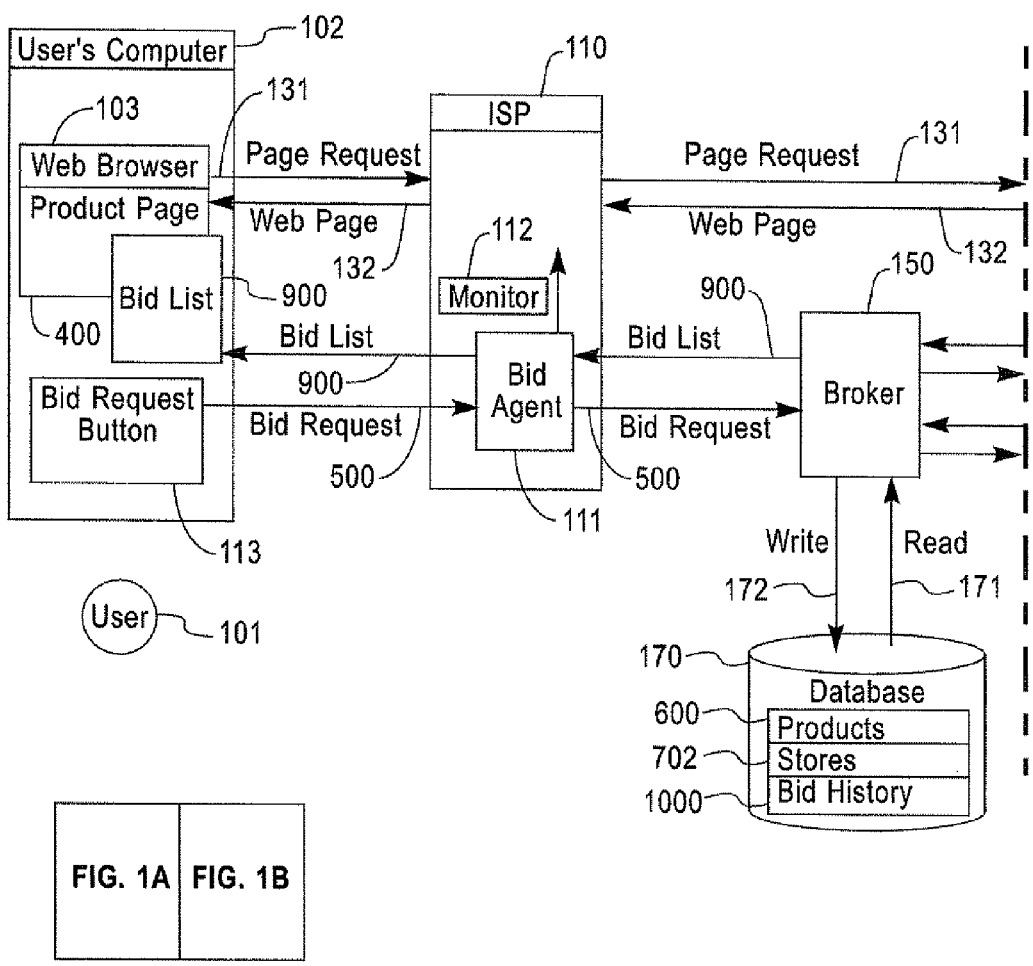
FIG. 1 is a block diagram of one preferred system architecture.
Figure 1B:
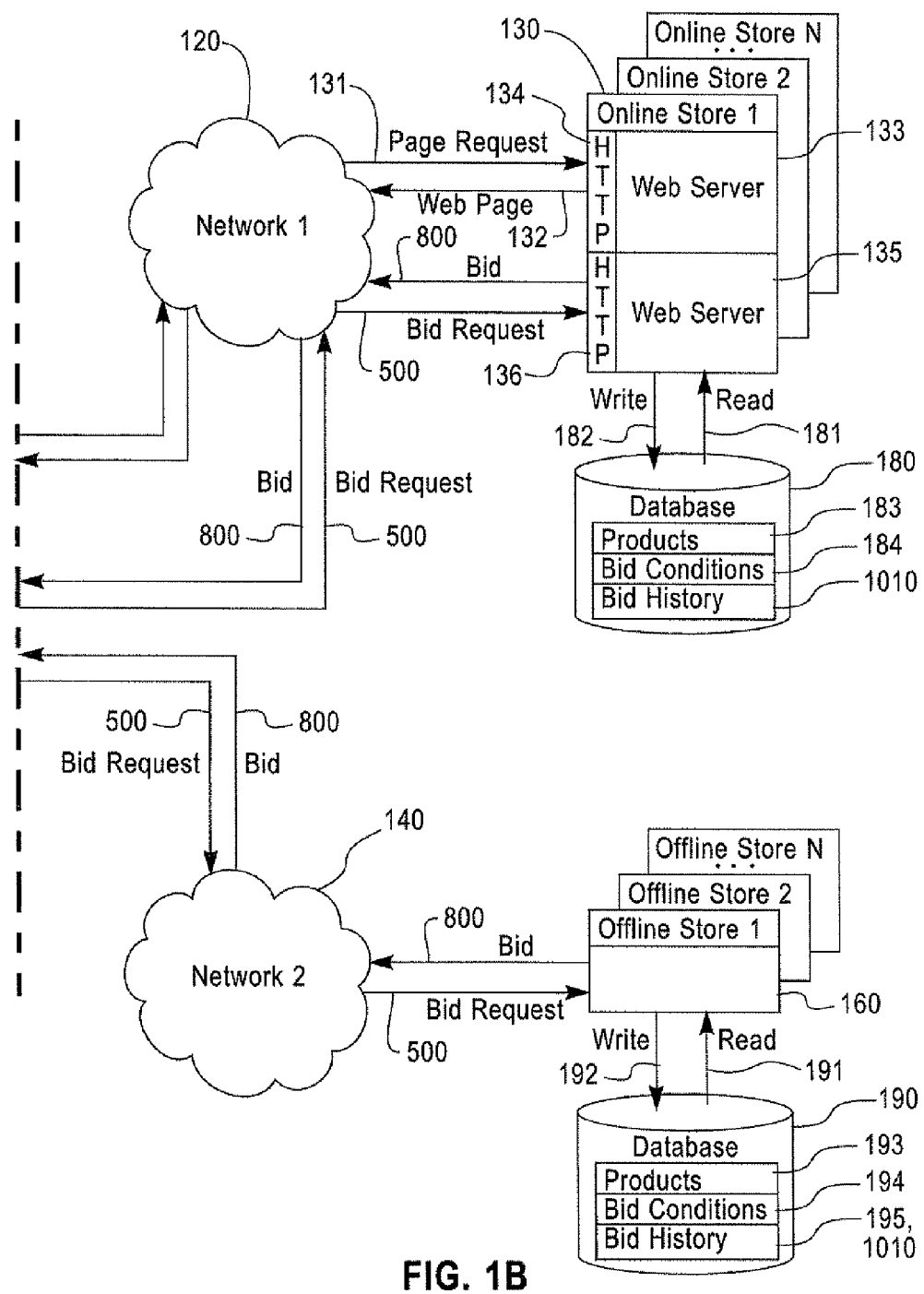

FIG. 1 (100) is a block diagram of one preferred system architecture showing one or more users (101), one or more computers used by the users (102), one or more ISPs (Internet Service Providers) (110), one or more online stores in the Internet (130), zero or one or more offline stores (160), i.e., brick-and-mortar stores, a broker system (150), a computer network (120) that is used for communication between the user computers (102) and the online stores (130), and between the broker system (150) and the online stores (130), and a network (140) that is used for communication between the broker system (150) and the offline stores (160).

A user (101) can access the computer network (120) by using an ISP (110). A user (101) first accesses an ISP (110) through a dial-up access program in his/her computer (102), or is otherwise always connected to the ISP whenever his/her computer is running, and logs in to the ISP server. Then the ISP connects the user to the network (120) and allows the user to navigate the Internet. Once connected to the network (120), a user (101) uses a Web browser program (103) to send out Web page requests (131) and receive incoming Web pages (132). All the Web page requests (131) a user makes first go to the ISP server (110), and then are sent out to the network (120) by the ISP. Also, all the incoming Web pages (132) a user receives from the network (120) are first received by the user's ISP server (110), and then sent to the user's Web browser program (103).

When a user (101) intends to purchase one or more products by using the Internet, he/she opens a Web browser program (103) in his/her computer (102) and visits online stores (130) in the Internet which sell the products of interest. Individual online stores are implemented with a Web server system (133) which receives Web page requests (131) from users and sends out requested Web pages (132) back to the users. For this communication, Web browser programs (103) and Web servers (133) typically use HTTP (HyperText Transfer Protocol) (134) which is a network protocol defined for that purpose. A user (101) navigates an online store (130), i.e., requests Web pages over the network (120) and browses Web pages which provide information of one or more products sold in the store. A Web page that provides information about one or more products is referred to as a product page (400).

As described earlier, the user's communication with one or more online stores (130) is done through the ISP (110). When a user (101) logs in to his/her ISP server (110), or is otherwise automatically connected to the ISP server, a bid agent process (111) for the user starts running. While the user (101) is connected to the network (120), the bid agent process (111) monitors (112) Web pages the user receives from the network (120) to find if the Web pages describe a product. When the bid agent process (111) finds that the user requested a product page (400), it asks the user (101), by using the bid request button (113) installed in the user's computer (102), if he/she wants to receive bids on the product described in the requested Web page from one or more stores. If the user (101) consents by clicking on the bid request button (113), within a reasonably short period time (e.g., in a few minutes), the bid agent process (111) responds with a list of bids (900) on the selected product and also on recommended comparable/related products from one or more stores by communicating with the broker system (150). Then the bid agent process (111) displays the prepared bid list (900) in the user's computer (102). Note that examples of products which are comparable with or related to the selected product include a replacement product such as a up-sell product which is similar to but more upscale than the selected product and a down-sell product which is similar to but more down-scale than the selected product, and a complementary product such as a cross-sell product which is complementary in function to the selected product.

The user (101) has several options in responding to the displayed bid list (900). First, the user (101) may ignore the bids in the displayed list (900). Second, the user (101) may accept one or more bids on the selected/comparable/related products in the list (900), and communicate with the store which made the bid to purchase the selected product. Third, the user (101) may select one or more of the bids in the list (900), and send a request for another round of bids from the selected stores. After the user (101) responds with one or more of these options, he/she can go back the original online store (130) and continue shopping in the store.

Now we will explain the bid process (300) of how bid requests (500) are processed in the broker system (150) and participating stores (130 and 160). When a user (101) indicates to the bid agent process (111) that he/she wants to receive one or more bids by clicking on the bid request button (113), the bid agent process (111) passes the bid request (500) to the broker system (150). Before passing the bid request (500) to participating stores (130 and 160), the broker system (150) makes two decisions: a decision on what products are related to the selected product, and a decision on which stores will be sent the bid request (500). To make the first decision, the broker system (150) performs a search by using product attributes against the information stored in the product table (600). The search result provides a list of products related to the selected product in that they have a similar set of attributes (612 and 701) as the selected product and that their attribute values are close to those of the selected product. Details of this product search process by using a product distance measure will be described later with FIG. 6. To make the second decision, the broker system (150) reads the product table (600) and store table (702) stored in its database (170), and finds stores which sell the selected product (and the related products). After making these two decisions, the broker system (150) sends out the bid request (500) to the selected participating stores (130 and 160) for bids on the selected product and its comparable/related products.

The participating stores (130 and 160) are the stores which have made an agreement with the broker system (150) to make bids on products as the broker system (150) requests. A participating store can be either an online store (130) operating in a computer network such as the Internet (120) or an offline store (160), i.e., brick-and-mortar stores, which can be reached by other types of network (140) such as telephones and faxes. A participating online store (130) has a bid server (135) which is a computer process always running and constantly listening to the network (120) to find incoming bid requests (500) from the broker system (150). When the bid server (134) receives a bid request (500) from the broker server (150), it makes one or more bids on the selected product and comparable/related products by using the data stored in its database (180), i.e., product data (183) and bid condition data (184). Bid conditions (184) includes one or more of the following: a selected product price, a shipping method, a shipping time, a handling method, a product packaging, a set of product delivery instructions, a provision of better deals for bundling two or more products, a recommendation of comparable and/or related products, a provision of customer service programs including express checkout in online stores, wish lists, gift registries, reward programs, discount for certain shopping groups, custom-configurable products, email notification services, and other such items. A bid server (135) may be implemented as a Web server, and the communication between the bid server (135) and the broker system (150) may be done by using HTTP (136) or another such appropriate protocol.

When receiving a bid request from the broker system (150), participating stores (130 and 160) respond to the broker system with their bids (800) on the selected product and one or more comparable/related products. The broker system (150) waits a reasonably short period of time (e.g., a couple of minutes, but it could be longer depending on the situation) for the bids from the participating stores (130 and 160) to arrive. Then it compiles the bids, creates a bid list (900), and sends it to the bid agent (111) which passes the bid list (900) to the user's computer (102). Also, the broker system (150) records the bid list (900) in the bid history part (1000) of its database (170). After receiving the bid list (900), the user (101) can review the bids in the list (900), and, as described earlier, he/she can ignore the bids, select one or more bids, or request another round of bids to the selected stores. Information on how the user reacts to the bids on the list (900) is passed to the broker system (150) through the bid agent (111) and recorded also in the bid history part (1000) of the broker system's database (170). The broker system (150) also sends out (optionally a portion of) the information to the stores (130 and 160) which participated in the bidding. The participating stores may store the information in the bid history section (1010) of their database (180 and 190) for later reference.

Note that in an alternative preferred embodiment, the ISP (110) can be removed and the bid agent (111) can be located in the user's computer (102). However, while the privacy given by the ISP (110) can not be guaranteed in this embodiment, the system (100) is simplified.

Figure 2A:
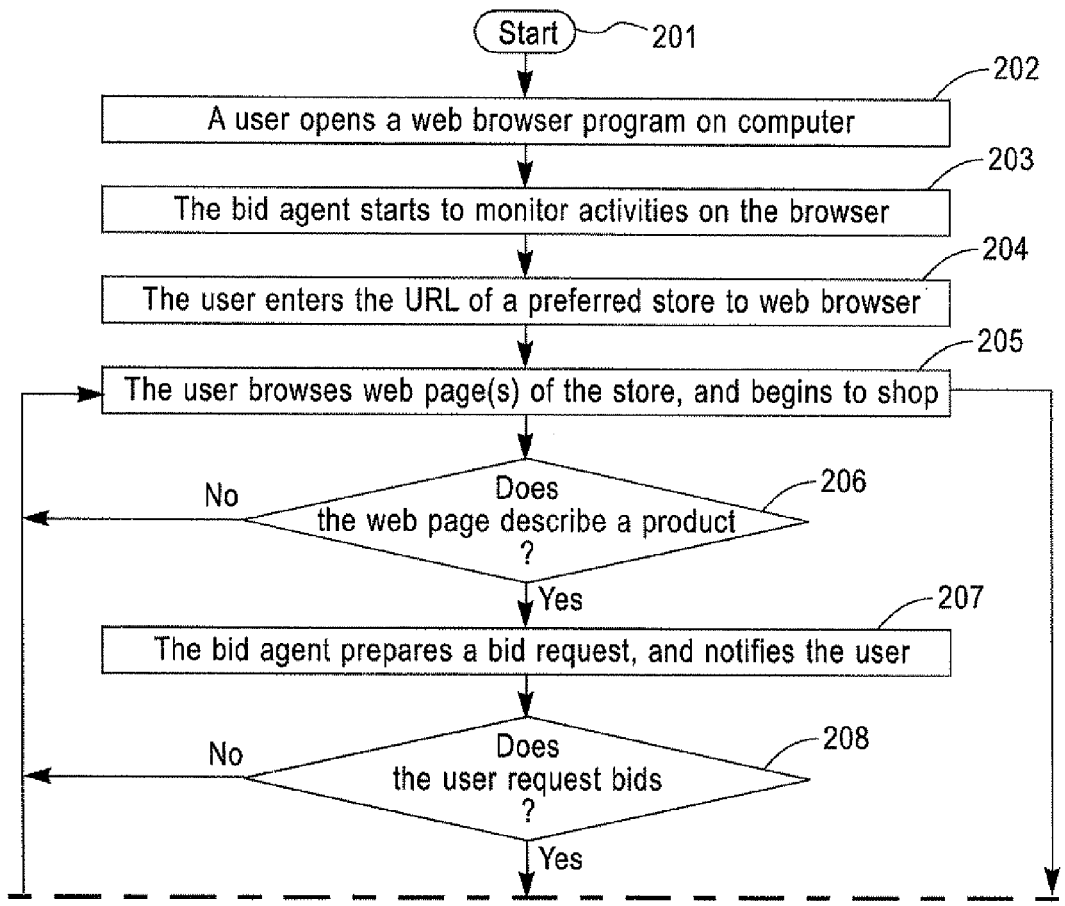
FIG. 2 is a flow chart of a preferred business process.
Figure 2B:
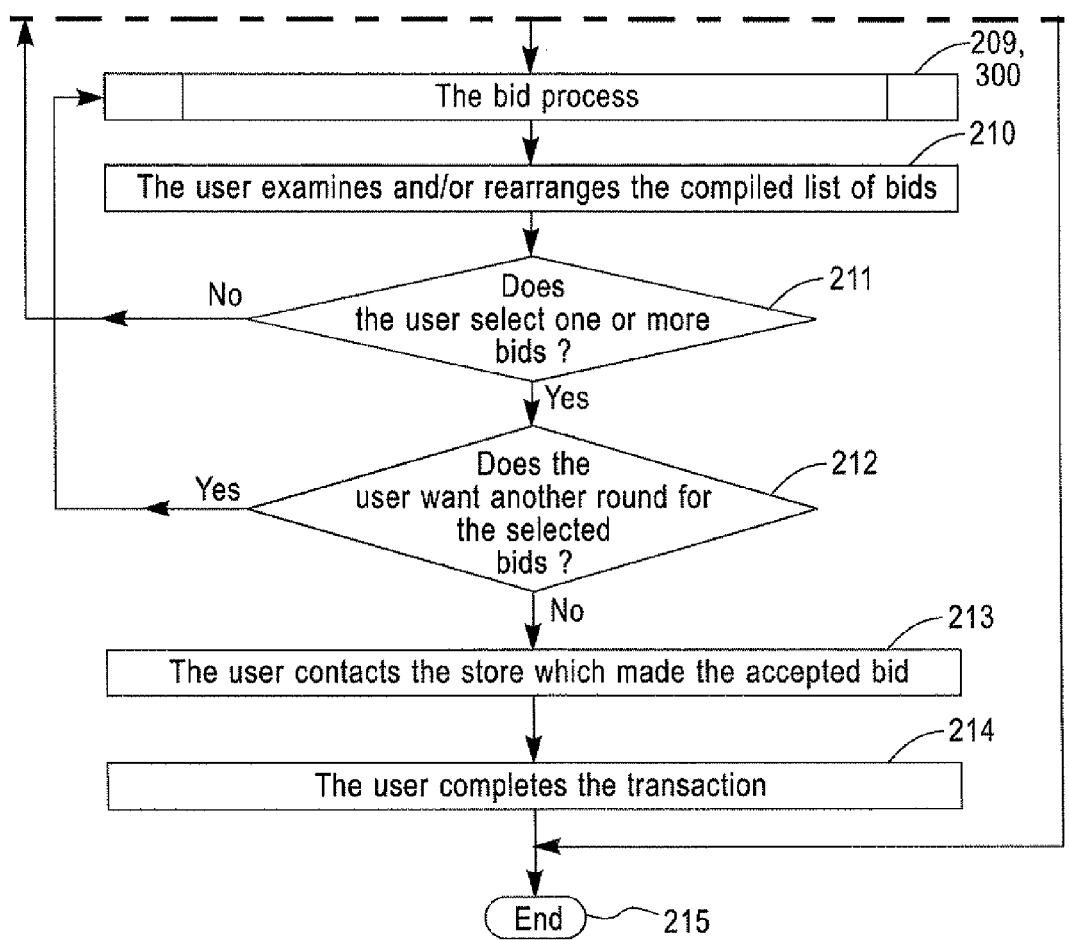

FIG. 2 (200) is a flow chart of the business process showing steps which a shopper, i.e., a user (101) goes through when he/she shops by using this invention. The first step (202) is that a user (101) opens a Web browser program (103) on his/her computer (102). Second (203), as the shopper (101) sends out Web page requests (131) from his/her Web browser (103) to the network (120), the user's ISP (110) starts a bid agent (111) for the user (101) which continuously monitors the Web pages (132) the user (101) downloads from the network (120). Third (204), the user (101) visits an online store (130) over the network (120) and downloads Web pages about products, i.e., product pages (400). Fourth (205), the user's bid agent (111) continuously monitors Web pages (132) user downloads to see if the page is a product page (400). That is, the bid agent process (111), while running in the user's ISP server (110), identifies all the Web pages going to the user (101), and parses the content of the Web pages if the pages describe one or more products and specifies their prices. If so (207), the bid agent (111) parses the content of the Web page and extracts product information described in the Web page such as product name (401), product price (402), and product detail attributes (405). By using this information, the bid agent (111) prepares a bid request (500) and notifies the user (111) that a bid request is ready for the product described in the Web page (132) the user is looking at. Then (208), the user (111) is asked if he/she consents to submit the bid request (500) to participating stores. If the user consents, a bid process (300) will be started.

The bid process (209 and 300) provides a list of bids (900) on the selected product and other comparable/related products from participating stores (130 and 160). The details of the bid process (300) will be described later for FIG. 3. The next step (210) is that as the user (101) receives the bid list (900) from the bid agent (111), he/she can examine the bids in the list. Also, the user can rearrange the order of bids in the list by sorting them in various ways, i.e., by price, by stores, by product attributes, by store attributes (e.g., shipping and handling cost, delivery methods, state tax, customer service types, reputation, and any promotion program), and by product types (in case of related products). The user (101) can make a decision on the submitted bids (211). The user can ignore or reject the bids, and continue to browse other Web pages in the network (120). Or he/she can select one or more bids from the bid list (900). If desired (212), the user can request another rounds of bids against the stores which made the bids the user selected. Each of the second bids originates from one or more stores that participated in an auction and each of the second bids conforms to the bid conditions selected by the user. When the user completes all the bid rounds he/she desired, he/she can complete the transaction directly on the bid list by providing appropriate information (such as credit card information). Otherwise (213), he/she can contact one or more stores which made the accepted bids (213). If the store which made the accepted bid is an online store (130), the user (101) can visit its Web page of the selected product in the online store. Also, if the user has accepted bids from more than one store, he/she needs to contact those stores. Finally (214), the user completes the transaction, i.e., the purchase of one or more products while contacting the stores which made the accepted bids.

Figure 3A:
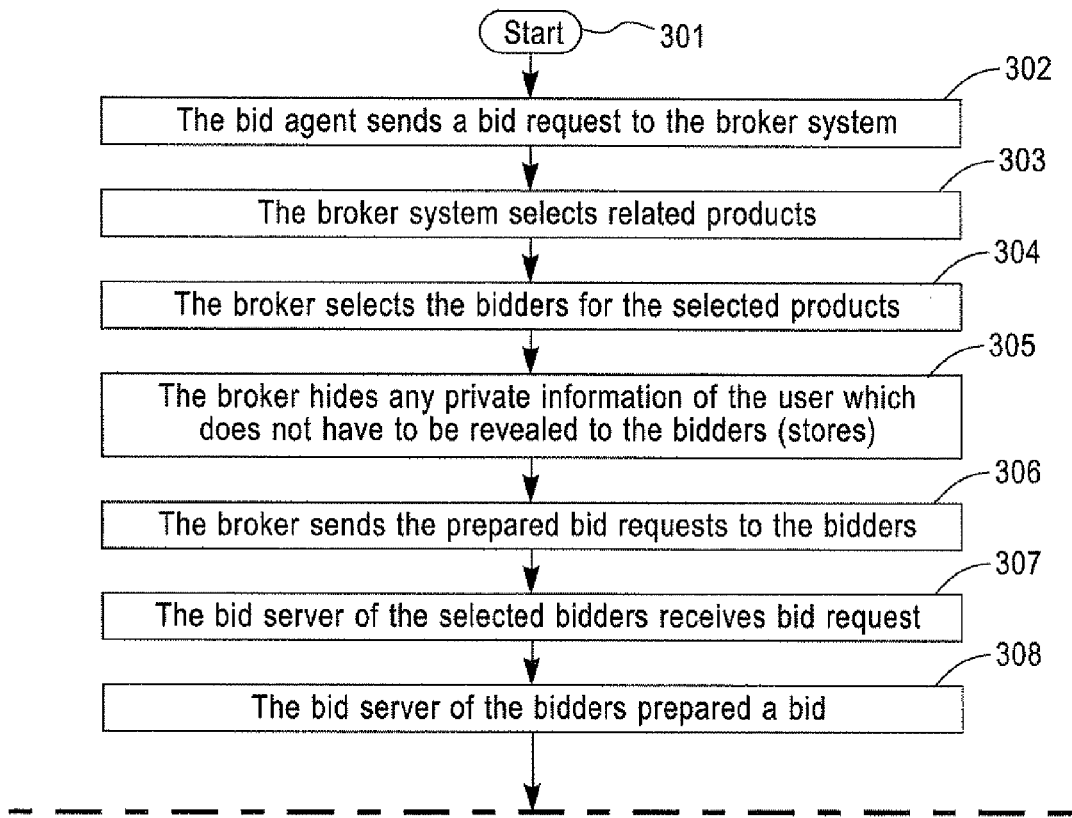
FIG. 3 is a flow chart of a bid request process.
Figure 3B:
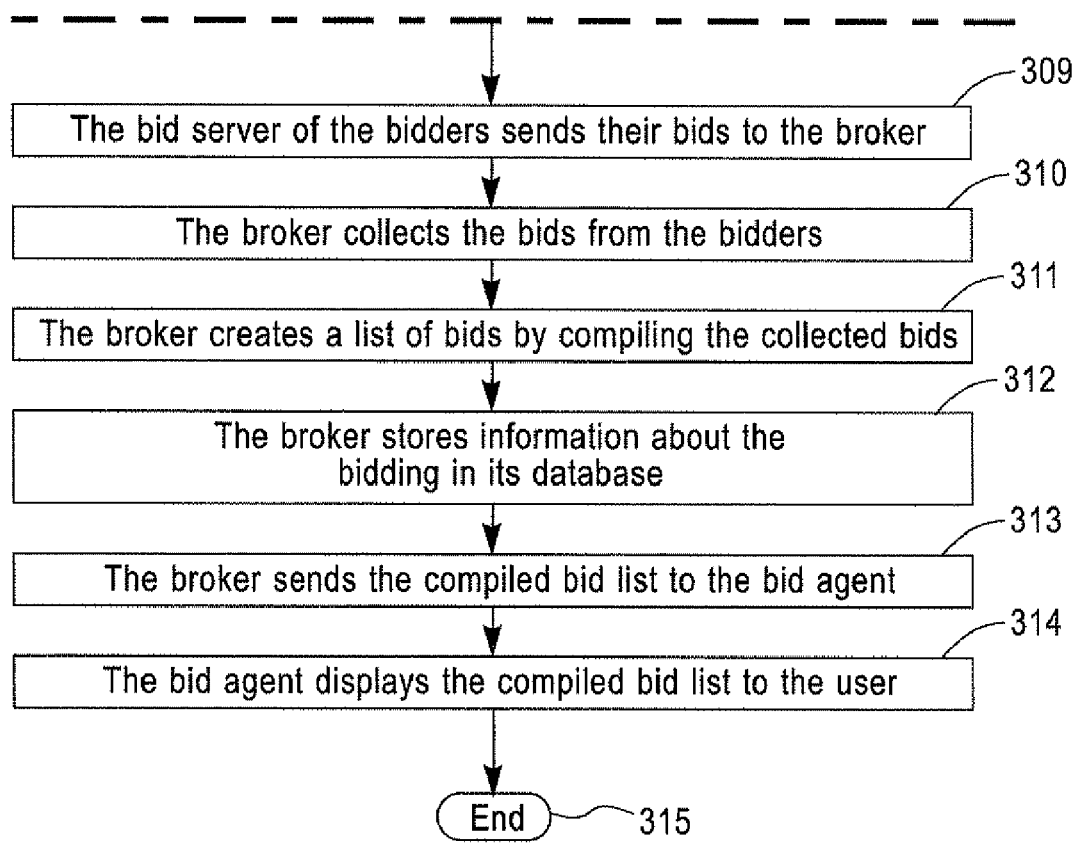

FIG. 3 (300) is a flow chart of the bid process showing the detail steps of the process (209) introduced in FIGS. 1 and 2. The first step (302) is that the bid agent (111) of the user (101) sends the prepared bid request (500) to the broker system (150). The broker system updates the bid request and prepares one which it will send to the participating stores (130 and 160). By using the product information (600) stored in its database (170), the broker system (150) decides on products which are comparable with and/or related to the product described in the Web page the user is looking at in his/her Web browser (303). When we describe FIG. 6 later, we will explain how the broker system (150) decides comparable or related products in detail. Also by using the store information (702) recorded in the database (170), the broker system selects stores which can make bids on the selected products and the comparable/related products (304). Note that if this bid process is used for a second or later bid rounds, the steps of (303) and (304) will be trivial. Before the broker system sends out the bid request, it makes sure that the bid request does not show any private, identification information about the user to the participating stores (305).

Next (306), the broker system (150) sends out the prepared bid request for the selected product and the comparable/related products to the selected participating stores (130 and 160). Note that the selected participating stores can be either online stores (130) which the broker system (150) can access over a computer network (120) such as the Internet, or offline stores (160) which the broker system (150) can access over some other form of network (140) such as telephone and fax. The major difference between online and offline stores is in the methods they provide to users (i.e., shoppers) and the broker system (150) for communicating with them. Beyond the communication methods, online and offline stores operate in a similar fashion and use similar database systems (180 and 190) which are updated with about the same frequency. In online stores (130), a bid server process (135) receives bid requests from the broker system (150) through an interface (136) which uses a network protocol such as HTTP (307) or other appropriate protocol. Offline stores (160) receives bid request by using tools such as telephones or faxes. The use of telephones and faxes for communication in offline stores may require some manual effort although it can be automated to some degree.

Next, the participating stores that received a bid request prepare one or more bids on the selected and related products (308). To make bids, the bidder(s) examines the product information described in the bid request, and also uses information about products and bid conditions stored in the store database (180 and 190). The bidder(s) (130 and 160) send(s) their bids (800) to the broker system (309) within a reasonably short period of time. The bidders (130 and 160) come up with their bids (800) by using a bid engine which optimizes the price of the selected product by dynamically matching pricing to availability and changes in supply and demand, and also considering product cost and bid history.

The broker system (150) collects the bids (800) from the participating bidders (310). Then (311), the broker system creates a list of bids (900) by compiling the bids, i.e., grouping bids by products and sorting them by bidding price or by other bids conditions. Then the broker system (150) records the created bid list in its database (170), and sends it to the bid agent (111) of the user (101), Finally (314), the bid list (900) is passed to the user's computer (102) and displayed for the user's examination. In order to facilitate the compilation of bids from different bidders, the broker system (150) may requires a certain format for individual bids including a minimum number of attributes and types of attributes. Also to create lists for bids on comparable and related products, the broker system (150) requires a certain format for bids on such products. When we describe FIGS. 8 and 9 later, we will explain such constraints on individual bid format in detail.

Up to this point, we have described the present invention at a high level providing a block diagram of one preferred system architecture and a flow chart of the business process. Before we move to the detail description of components in the block diagram, here we briefly mention how some of the objects of the invention were achieved. First, FIGS. 1, 2 and 3 illustrate that the invention provides shoppers with dynamic pricing of products while allowing the shoppers to select any online store as a starting point. At the same time, the business process of the invention is fair to the merchant who owns the starting point online store, because the store has fair opportunities to submit bids with other stores. Second, the invention does not require the service provider to scour Web sites for collecting price information of products. Instead, participating stores provide prices of selected products in their bids. Third, the invention provides shoppers with bid conditions which include various factors related to product purchase beyond product price. Also, the invention provides shoppers with bids on products comparable and/or related to the selected product as well as bids on the selected product. Finally, the invention provides an efficient means to control the flow of shoppers' personal information so that shoppers' private information will not be revealed to stores without shoppers' approval.

Figure 4:
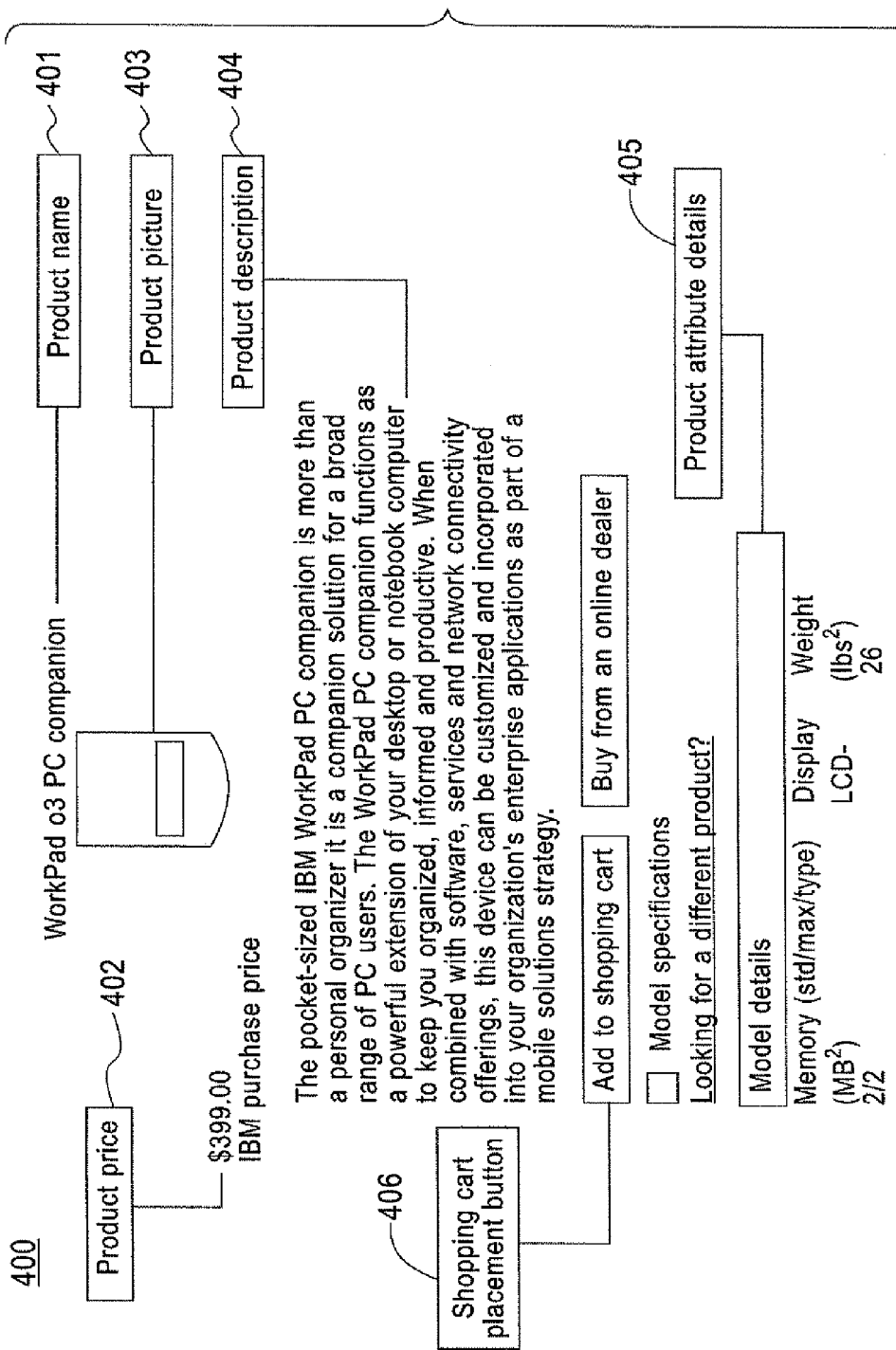
FIG. 4 is a screen shot of a product page.

FIG. 4 (400) is a screen image of a product page from online stores (130) which are browsed by users (101). A product page describes one or more products which the online store sells, and typically displays such product information as product name (401), product price (402), product picture (403), product description (404), and product attribute details (405). Also, a product page may show a button to place the product in the user's shopping cart (406). The bid agent process (111) running in the user's ISP server tells if a Web page a user requests is a product page or not by parsing the Web page content and checking the existence of these components in the Web page. The minimum information on a product page which is required for the invention to work is product name (401) (or other unique identifier) and product price (402). Product name (401) is required to identify the product on which stores will make bids. If product name (401) is not unambiguous, the bid agent process (111) needs to infer the correct product name by using the product description (404), product attribute details (405) and any other information identifying products such as manufacturer name and model number. Product price (402) is also required because it will be used as the starting bid price for participating bidders in the auction process.

Figure 5:
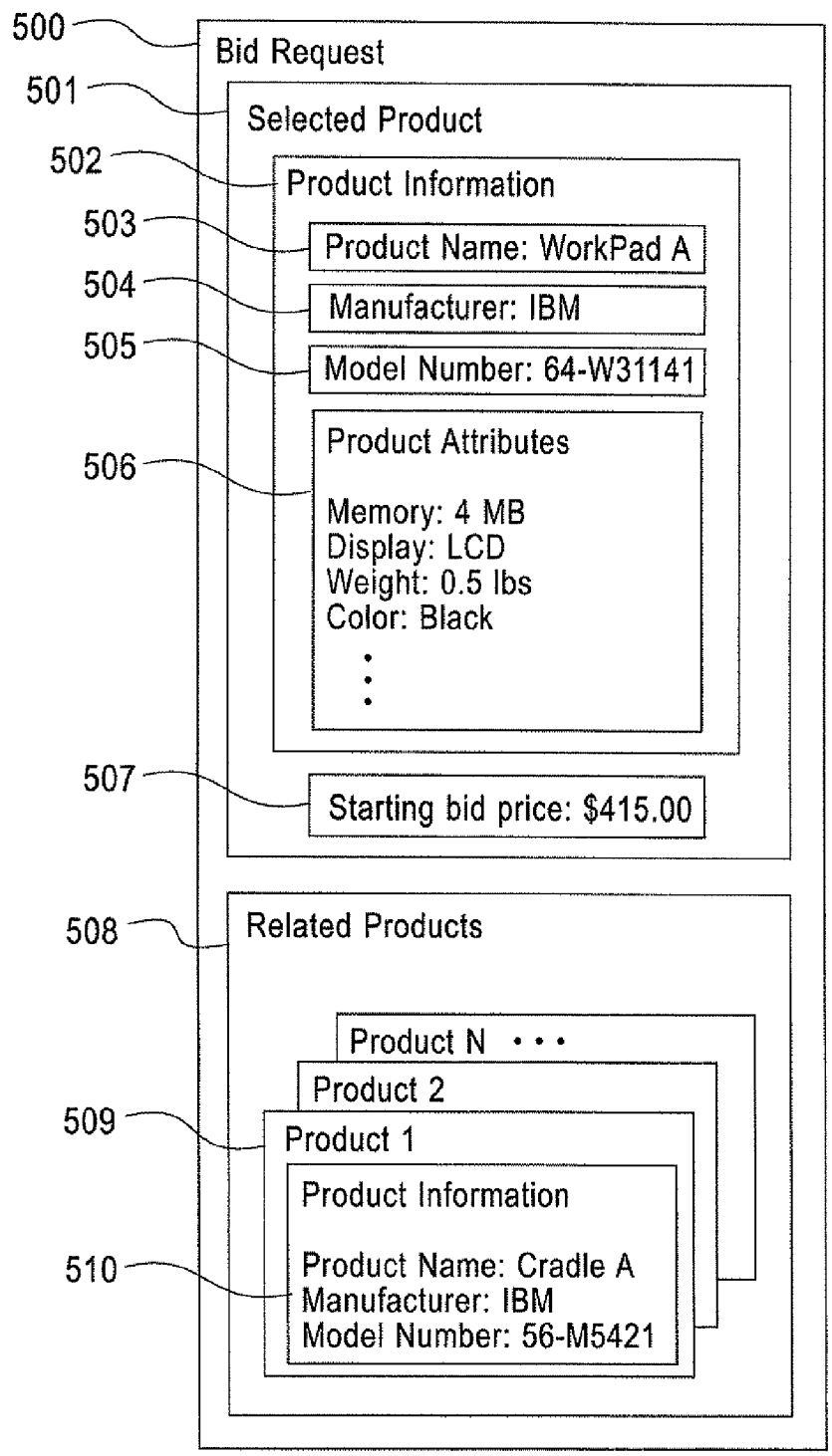
FIG. 5 is a block diagram of a bid request.

FIG. 5 (500) is a block diagram of a bid request. An initial bid request is created by a bid agent process (111) as the agent process finds that the user (101) requests a product page (400) from an online store (130). The initial bid request is simple in that it contains only basic information about the selected product which the bid agent extracts from its product page (400), i.e., product name (401), product price (402), and product attribute details (404). It also contains a question if the user (101) wants to receive bids on the selected and comparable/related products from participating stores. As the user (101) consents to receive bids, the bid agent (111) passes the initial bid request to the broker system (150). Then, as described earlier, the broker system updates the initial bid request by adding more information on the selected product and adding entries of related products. The outcome has two parts: the selected product part (501) and the related product part (508). Note that the related product part (508) is optional. There may be zero or more related products included in the bid request depending on the type of the selected product and the availability of related products.

The selected product part (501) contains information about the product which was described in the product page (400) the user (101) requested. It contains product information (502) such as product name (503), manufacturer (504), model number (505), and other product attributes (506).

Also, the selected product part (501) contains the starting bid price information (507) which participating stores will use in their bid on the selected product. The starting bid price (507) is the price of the selected product as described in the product page the user (101) requested. The bid prices which the participating stores make are lower than or equal to the starting bid price (507).

The related product part (508) delivers the information about one or more products which are comparable with and/or related to the selected product, i.e., a replacement product such as a up-sell product which is similar to but more upscale than the selected product and a down-sell product which is similar to but more down-scale than the selected product, or a complementary product such as a cross-sell product which is complementary in function to the selected product. As explained earlier, the broker system (150) finds these related products by using the product information (600) stored in its database (170). Details of the process will be described later with FIG. 6. Each related product (509) in the bid request (500) contains product information (510) which is similar to that (502) of the selected product (501).

Figure 6:
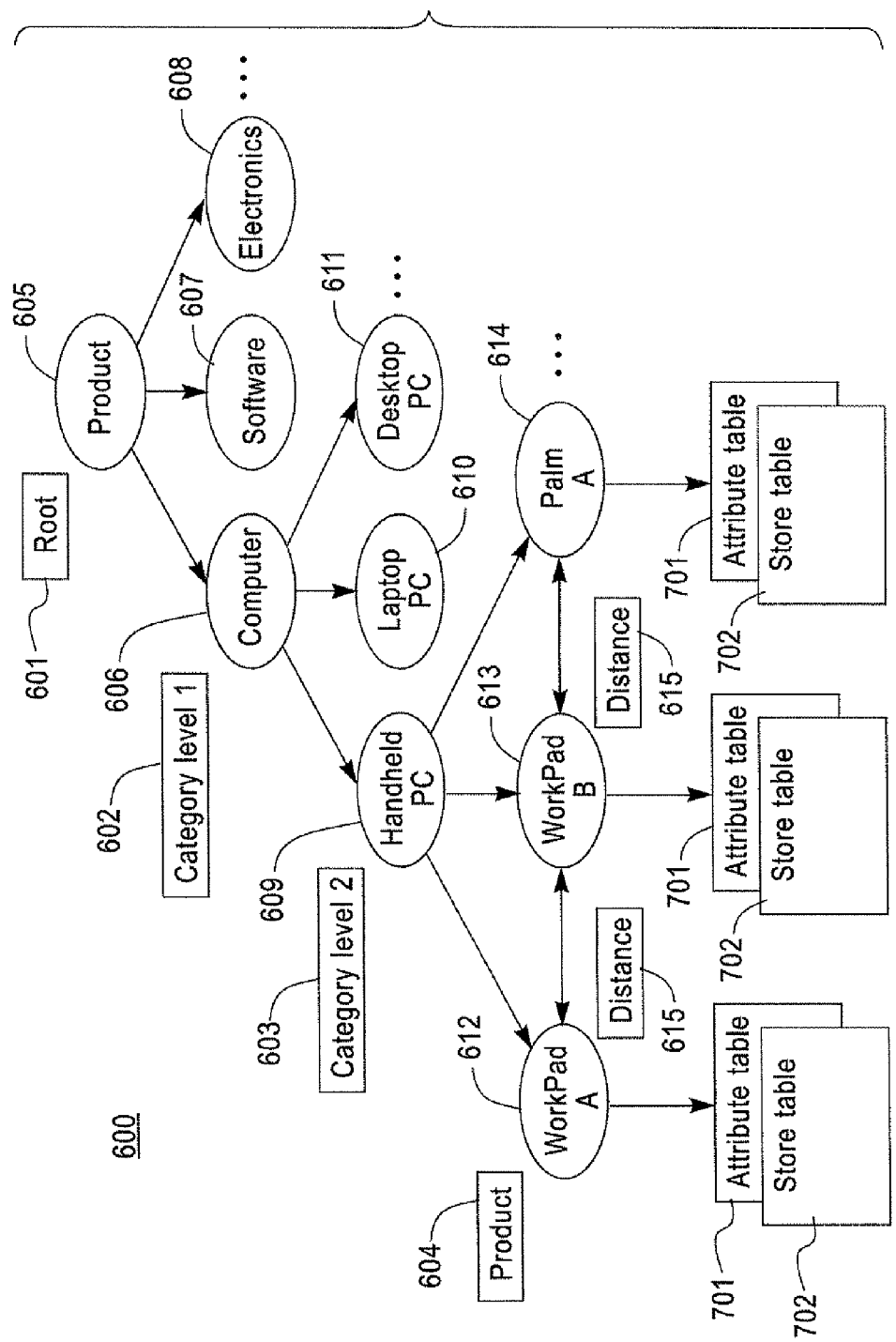
FIG. 6 is a sample product ontology.

FIG. 6 (600) is a sample product ontology showing the hierarchical relationship among products which a broker system (150) may deal with. A form of product ontology is stored in the database (170) of the broker system (150) and used for finding detail attributes of a selected product, finding products related to a selected product, and finding stores which will participate in bidding on the selected and related products. A product ontology has a tree structure where each node can have only one parent node and one or more child nodes. At the top, there is a root node which has only child nodes but no parent node. At the bottom, there are leaf nodes which have only a parent node but no child node. In the sample product ontology (600), the root node (601) represents all the products in the system (605), while leaf nodes (604) represent individual products which are ones in the handheld personal computer category in this case, i.e., WorkPad A (612), WorkPad B (613), Palm A (614), and so on. Nodes between the root (601) and leaf nodes (604) represent various levels of product categories. At the first level (602), products are grouped into categories of computers (606), software (607), electronics (608) and so on. At the next level (603), a category in the previous level, i.e., computers are further classified into handheld PCs (609), laptop PCs (610), desktop PCs (611), and so on.

The method for categorizing products, the numbers of levels for categorizing products, and the number of products and categories may vary from one product ontology to another. Note that a product ontology can be constructed not only for simple products comprising one component (e.g., books, videotapes, and CDs), but also for compound products comprising two or more components (e.g., computers comprising a CPU, one or more memories, one or more hard drives, a monitor, a keyboard, a mouse, a camera, a microphone and so on). Also note that a product ontology can be built not only for physical products but also for services (e.g., insurance, training, financing, banking, stock brokerage, real estate sales, car sales, airline tickets, real estate maintenance, professional services, legal services, business management services, medical services, sales, travel, education, entertainment, computer programming, technical design, web page design, home maintenance, repairs and other services).

Each product node (604) in the product ontology (600) is associated with two tables, i.e., an attribute table (701) which records details of the product attributes, and an store table (702) which records details on the stores selling the product. The attribute and store tables will be described in detail later with FIG. 7. The store table (702) is used by the broker system (150) to decide which stores it will send a bid request to. The attribute table is also used by the broker system (150) to cluster products comparable with the selected product. While products complementary in function to a selected product are determined by each store according to their marketing strategy and the product availability, products which replace (or are comparable with) a selected product can be determined by using a distance measure (615) between products. Product distance, $D_{ij}$, between two products, $P_i$ and $P_j$ is defined as follows:

$$D_{ij} = \Sigma_k |w_{ik}A_{ik} - w_{jk}A_{jk}|, \text{ where } k=1, 2, \ldots, n.$$

$A_i$ and $A_j$ represent attributes of $P_i$ and $P_j$, respectively, while $w_i$ and $w_j$ represent weight factors of individual attributes of $P_i$ and $P_j$, respectively. The weight factors of individual product attributes are determined by the service provider of this invention when they construct the product ontology (600). Also the weight factors can be adjusted depending on various factors such as product availability, changes in supply and demand, customer responses to previous bids, and marketing strategies of stores, so that the closeness of products can be updated accordingly. Note that products in the same or neighboring categories in a product ontology tend to have the same or similar number and types of attributes, which makes the calculation of $D_{ij}$ with this equation possible. $P_i$ and $P_j$ are replacement products to each other if $D_{ij}$ is smaller than a certain value called the replacement factor, r, i.e., $$D_{ij} < r.$$

FIG. 7 (700) shows a sample attribute table (701) and a sample store table (702) of a product, WorkPad A, presented in a product ontology (600). The attribute table (701) comprises a number of name-value pairs of product attributes. The number and types of product attributes vary from one category to another in the product ontology. Examples of attributes of handheld PC products include product name, manufacturer name, model number, UPC (Universal Product Code), SKU (Stock Keeping Unit), or ISBN in case of books, memory size, display type, weight, battery type, and product color. The store table (702) shows the stores which sell the selected product. One attribute that is essential to make the invention work is store number (705) or store name (706) or some other unique store identifier. Additionally, the table records various attributes regarding the sales of the selected product which are useful to decide the stores to which the bid request is sent. They include the last time the availability of this product was checked (707), the last time the store made a bid on this product (708), and the last time a bid on this product from this store was accepted (709). The table also provide other information about the stores such as their Home page address (in case of online stores) (711) and their special sales programs (710), if any.

FIG. 8 (800) is a sample bid from a store, foo.com, composed of three parts: a bid on the selected product (801), bids on products comparable with (or replaceable for) the selected products (802), and available services (803). Note that it is possible for a bid (800) from a store to include one or more bids on products complementary in function to the selected product, but this sample bid (800) does not include such bids. The bid on the selected product (801) gives most importantly, the bid price (806) on the product (805) by this bidder (804). It also provides total cost (809) by different shipping options (808), tax information (809), and Web page address (807) for completing the transaction if accepted. The bids on the comparable products (802) show comparable product names (812) and bidding price (813) on each of them, along with Web page information (814 and 815). Finally, the available service table (803) lists all the services the store provides with the sales of the products. Examples of the services are express checkout, wish list maintenance, build-to-order type product configuration, and reward program for purchase. Beyond product price, the level and types of customer services and convenience become more and more important in customers' making purchase decisions.

FIG. 9 (900) is a sample bid list showing a compiled bid list for a selected product (901) and a compiled bid list for comparable products (902). As explained earlier, the broker system (150) collects bids (800) from participating stores (130 and 160) and creates this bid list (900) by compiling the collected bids. Note that a bid list (900) may include a list of bids on products which are complementary in function to the selected product, but this sample bid list does not show such bids. The compiled bid list for the selected product (901) basically shows the bid price (904) on the selected product, WorkPad A, in this case, from various bidders (903). It also shows total cost (906) by different shipping options (905), state tax information (907), Web pages for completing purchase (908), and additional services provided by each bidder (909). The compiled bid list for 101 comparable products (902) shows product name (910), bidder name (911), bid price of each bidder (912), Web page address for viewing more product information (913), and Web page address for completing purchase (914).

Figure 10:
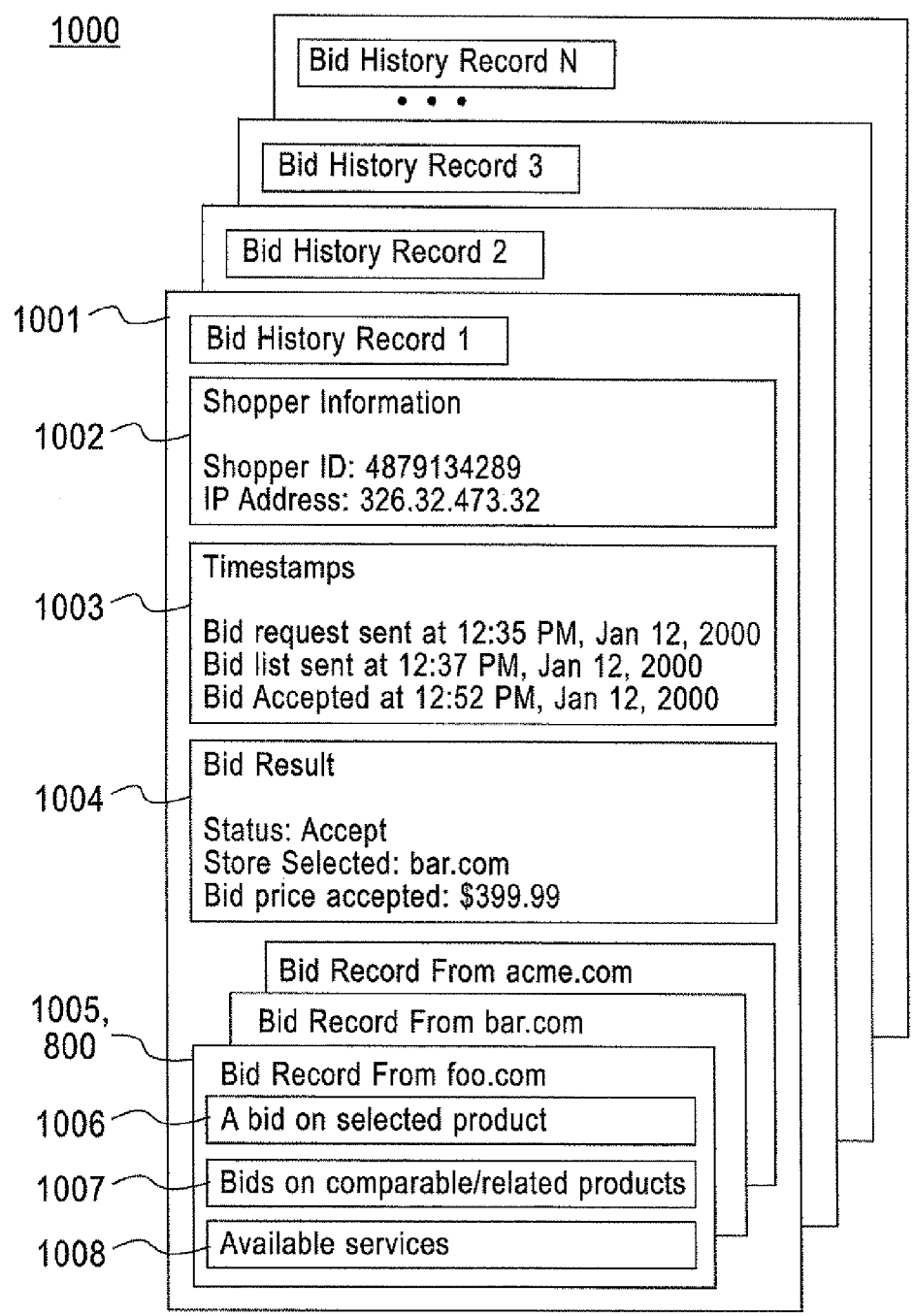
FIG. 10 is a block diagram of a bid history record in the broker system.

FIG. 10 (1000) is a block diagram of a bid history record in the broker system (150). As explained earlier, the broker system (150) records the outcome of each bidding in its database (170). After the user (101) makes a decision on submitted bids on the selected product, the decision is passed to the broker system (150) and stored in a bid history record (1001). A bid history record consists of four parts: shopper information (1002), timestamps of actions (1003), bid result (1004), and bids from participating stores (1005 and also 800). The shopper information part (1002) basically contains shopper identification and his/her computer's IP address or other unique address identifier. Additionally, it can include the user's history of using this invention. The timestamp part (1003) stores the timestamp of each action taken during this bid process including the time when the bid request (500) was sent from the bid agent process (111) to the broker system (150) and to participating stores (130 and 160), the time when the bid list (900) was sent from the broker system (150) to the bid agent process (111) to the user's computer (102), the time for a second round of bids, if any, and the time when the bid was accepted or rejected. The bid result part (1004) records the outcome of the bid, i.e., if a bid was accepted or not, if so, what store made the bid, and what was the bid price. The last part (1005) of a bid history record (1001) is the recording of bids from all the participating stores. Each bid in this part is the same as one described in FIG. 8 (800), and so it contains a bid on the selected product (1006), bids on the comparable/related products (1007), and other available services (1008).

Figure 11:
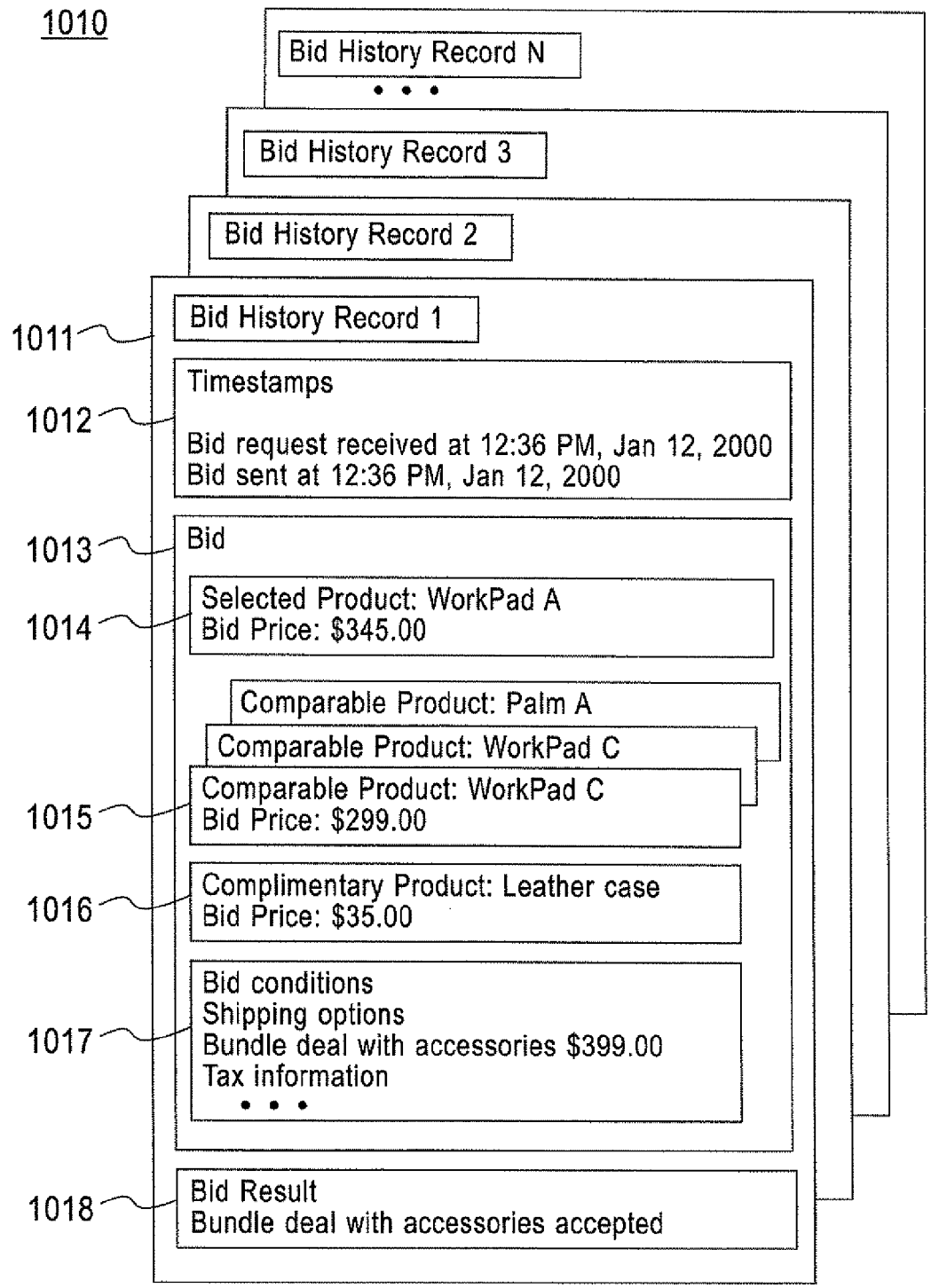
FIG. 11 is a block diagram of a bid history record in a bid server.

FIG. 11 (1010 and 195) is a block diagram of a bid history record stored in the database (180 and 190) of a participating store (130 and 160). As explained earlier, when the broker system (150) receives the outcome of a bidding from the user (101), it notifies all the participating stores about the outcome. The participating stores (130 and 160) record the bid result in a bid history record (1010 and 195) of their database (180 and 190) for later use. A bid history record (1011) consists of three parts: timestamps (1012), bid (1013), and bid result (1018). The timestamp part (1012) records the time of actions which happened during the bid process. The entries in this part is similar to, but a subset of what was recorded in the timestamp part (1003) of the broker system (150). The bid part (1013) is a recording of the bid (800) this store made during the bid process, and so it contains a bid on the selected product (1014), bids on the comparable/related products (1015), bids on the complementary products (1016), and bid conditions (1017) such as shipping options, bundle deals, and rewards. The last part (1018) of a bid history record (1010) is the bid result. If the bid from this particular store was accepted by the user (101), then this store knows the details of the accepted bids and records them in the bid result part (1018). If the bid from this store was not accepted, the broker system (150) may provide this store with information about the accepted bid depending on the agreement between the broker system and the participating stores. The recorded bid history can be referenced later when the store needs to make a bid on similar products.

We claim:

1. A computer-implemented method of doing business on a network comprising:
   providing a user with access to a first online store through one or more networks and via an on-screen display, the first online store having one or more products, each with a product description and a price, the product description and price being provided to the user via the on-screen display;
   receiving one or more selection requests for said one or more products from the user via the on-screen display, wherein one of the products is a selected product;
   providing a fixed shopping mode, via the on-screen display, where said user conducts a product purchase transaction for said selected product via the first online store; and
   providing a dynamic price shopping mode, via the on-screen display, where the user initiates an auction in real-time for generating bids for the selected product from different online stores, other than the first online store;
   wherein the on-screen display allows the user to begin shopping in the fixed shopping mode, then initiate the auction in the dynamic shopping mode, then elect to return to shopping in the fixed shopping mode without being obligated to accept any of the bids provided in the dynamic shopping mode, but having a choice to select any of the bids provided in the dynamic shopping mode.

2. A computer-implemented method, as in claim 1, where the different online stores are provided by a set of pre-registered merchants that agree to provide the bids for the selected product.

3. A computer-implemented method, as in claim 1, where the bids include bid conditions that include any one or more of the following: a selected product price, a shipping method, a shipping time, a handling method, a product packaging, a set of product delivery instructions, a provision of better deals for bundling two or more products, a recommendation of comparable and/or related products, a provision of customer service programs including express checkout in online stores, wish lists, gift registries, reward programs, discount for certain shopping groups, custom-configurable products, email notification services, services, and products.

4. A computer-implemented method, as in claim 1, where one or more of the different online stores provides an additional bid for an additional product, other than the selected product.

5. A computer-implemented method, as in claim 4, where the additional product includes any one or more of the following: a replacement product, an up-sell product, a cross-sell product, a combination product to be used with the selected product, an alternative product, and a related product.

6. A computer-implemented method, as in claim 1, where one or more of the different stores can re-bid to the user after placing their bids.

7. A computer-implemented method, as in claim 1, where one or more of the selected products is organized in a product ontology.

8. A computer-implemented method, as in claim 7, where the ontology specifies one or more attributes of a service.

9. A computer-implemented method, as in claim 8, where the service includes any one or more of the following: insurance, training, financing, banking, stock brokerage, real estate sales, car sales, airline tickets, real estate maintenance, professional services, legal services, business management services, medical services, sales, travel, education, entertainment, computer programming, technical design, web page design, home maintenance, repairs, services, and products.

10. A computer-implemented method, as in claim 7, where the ontology specifies one or more attributes of a product.

11. A computer-implemented method, as in claim 10, where the attributes include any one or more of the following: a product name, a product manufacturer, a product model number, one or more product identification numbers including a product UPC (Universal Product Code), a product SKU (Stock Keeping Unit) number, or ISBN in case of books, one or more categories the product belongs to, one or more components of the product and their value, one or more accessories of the product, and one or more product features.

12. A computer-implemented method, as in claim 8, where the bid conditions are presented to the user arranged in an order according to one or more of the attributes.

13. A computer-implemented method, as in claim 1, where the auction can be any one or more of the following: a standard auction, a parcel bidding, a Dutch auction, a reverse auction, an express auction, a private auction, and a bartering.

14. A computer-implemented method, as in claim 1, where one or more of the bids are arranged in an order.

15. A computer-implemented method, as in claim 14, where the order includes any one or more of the following: one or more of the product attributes, a customer satisfaction rating, a price, a delivery, a handling option, a shipping time and cost, and existence of one or more customer programs including express checkout in online stores, wish lists, gift registries, reward programs, discount for certain shopping groups, custom-configurable products, and email notification services.

16. A computer-implemented method, as in claim 1, where one or more of the products is a complex product comprising more than one component.

17. A computer-implemented method, as in claim 16, where the more than one component is provided by at least two of the different online stores in a joint bid.

18. A computer-implemented method, as in claim 1, where one or more of the products includes one or more of the following: a set of one or more of the other products and a service.

19. A computer-implemented method, as in claim 1, where personal information about the user is not disclosed to the different online stores when the user initiates the auction.

20. A computer-implemented method, as in claim 1, wherein:
the first online store and the different online stores have been identified and preselected by the user.

21. A computer-implemented method, as in claim 1, wherein:
the bids conform to bid conditions.

22. A computer-implemented method, as in claim 1, wherein:
when the bids are generated, the user has the further choice to select one or more of the bids, and initiate another round of bids from one or more of the different online stores that provided the selected one or more bids.

23. A computer-implemented method, as in claim 1, wherein:
a starting price for the bids is a price set by the first online store for the selected product.

24. A computer-implemented method for enabling a user to purchase products on a computer network, comprising:
receiving requests for web pages from a web browser running at a user's computer;
obtaining the web pages and providing them to the web browser;
monitoring the obtained web pages to determine whether they include a product page that describes a product offered by a first online store;
when the monitoring determines that the web pages include the product page, parsing the product page to obtain information regarding the product;
preparing a bid request using the obtained information;
wherein a selectable icon is displayed on the web browser such that the user has a choice to select the selectable icon to begin a bid process, or to continue shopping at the first on-line store via the product page;
responsive to the user selecting the icon, beginning a bid process for the product by submitting the bid request to different online stores, other than the first online store;
receiving bids from the different online stores for the product, responsive to the bid request;
preparing a bid list from the received bids;
wherein the bid list lists information regarding the bids from the different online stores;
providing the bid list to the web browser for display thereon;
wherein, upon display of the bid list, the user has a choice to select one of the bids in the bid list to communicate with the online store that made the selected bid to purchase the product or a comparable product, or to continue shopping at the first on-line store via the product page.

25. The computer-implemented method of claim 24, wherein:
upon display of the bid list, the user has the further choice to select one or more of the bids, and initiate another round of bids from one or more of the different online stores that provided the selected one or more bids.

26. The computer-implemented method of claim 24, wherein:
the bid request submitted to the different online stores includes a price of the product obtained from the product page.

27. The computer-implemented method of claim 24, wherein:
the selectable icon is displayed with the product page on the web browser.

28. The computer-implemented method of claim 24, wherein:
the bid list is displayed with the product page on the web browser.

29. The computer-implemented method of claim 24, wherein:
the information obtained regarding the product offered by the first online store includes a name, price and attributes.

30. The computer-implemented method of claim 24, wherein:
the first online store and the different online stores are preferred online stores.

31. The computer-implemented method of claim 24, wherein:
the bid process comprises an auction in real-time.

32. A computer-implemented method for enabling a user to purchase products on a computer network, comprising:
providing requests for web pages from a web browser running at a user's computer to an Internet Service Provider (ISP); wherein:
the ISP obtains the web pages and provides them to the web browser;
a bid agent monitors the obtained web pages to determine whether they include a product page that describes a product offered by a first online store;
when the bid agent determines that the web pages include the product page, the bid agent parses the product page to obtain information regarding the product, and prepares a bid request using the obtained information;
displaying a selectable icon on the web browser such that the user has a choice to select the selectable icon to begin a bid process or to continue shopping at the first on-line store via the product page;
responsive to the user selecting the icon, communicating with the bid agent to begin the bid process for the product in which the bid request is submitted to different online stores, other than the first online store;
wherein the bid agent communicates with a bid broker that receives bids from the different online stores for the product, responsive to the bid request;
the bid broker prepares a bid list listing information from the received bids; and
receiving the bid list and displaying the bid list on the web browser;
wherein, upon display of the bid list, the user has a choice to select one of the bids in the bid list to communicate with the online store that made the selected bid to purchase the product or a comparable product, or to continue shopping at the first on-line store via the product page.

33. The computer-implemented method of claim 32, wherein:
upon display of the bid list, the user has the further choice to select one of the bids in the bid list, and send a request for another round of bids to the different online stores.

34. The computer-implemented method of claim 32, further comprising:
displaying the selectable icon with the product page on the web browser.

35. The computer-implemented method of claim 32, further comprising:
displaying the bid list with the product page on the web browser.

* * * * *